US011120592B2

(12) United States Patent
Marinier

(10) Patent No.: US 11,120,592 B2
(45) Date of Patent: Sep. 14, 2021

(54) SYSTEM AND METHOD FOR ORIENTED BOUNDING BOX TOOL DEFINING AN ORIENTATION OF A TILTED OR ROTATED OBJECT

(71) Applicant: ELEMENT AI INC., Montréal (CA)

(72) Inventor: Joseph Marinier, Sherbrooke (CA)

(73) Assignee: ELEMENT AI INC., Montreal (CA)

( * ) Notice: Subject to any disclaimer, the term of this patent is extended or adjusted under 35 U.S.C. 154(b) by 0 days.

(21) Appl. No.: 16/142,399

(22) Filed: Sep. 26, 2018

(65) Prior Publication Data

US 2020/0098154 A1 Mar. 26, 2020

(51) Int. Cl.
*G06T 11/00* (2006.01)
*G06T 11/60* (2006.01)
*G06F 3/0486* (2013.01)
*G06F 3/0484* (2013.01)

(52) U.S. Cl.
CPC ............ *G06T 11/60* (2013.01); *G06F 3/0486* (2013.01); *G06F 3/04845* (2013.01); *G06T 2210/12* (2013.01)

(58) Field of Classification Search
CPC . G06T 11/60; G06T 2210/12; G06F 3/04845; G06F 3/0486
See application file for complete search history.

(56) References Cited

U.S. PATENT DOCUMENTS

| 9,075,933 | B2 | 7/2015 | Stone et al. | |
|---|---|---|---|---|
| 2006/0129933 | A1* | 6/2006 | Land | G09G 5/00 715/723 |
| 2007/0146325 | A1* | 6/2007 | Poston | G06F 3/038 345/163 |
| 2013/0014041 | A1* | 1/2013 | Jaeger | G06F 3/04883 715/765 |
| 2013/0038628 | A1 | 2/2013 | Look et al. | |

(Continued)

OTHER PUBLICATIONS

International Search Report and Written Opinion issued in International Application No. PCT/CA2019/051378, dated Jan. 2, 2020.

*Primary Examiner* — Pakee Fang
(74) *Attorney, Agent, or Firm* — Norton Rose Fulbright Canada LLP

(57) ABSTRACT

Systems and methods for an improved bounding box tool. The system can have processors configured to display a user interface on a display of a device, the user interface displaying image data. The processor can activate a virtual tool to define a bounding box. The processor can receive a first input data point at a first location relative to the image data. This can be defined by actuation of the input device. The processor can receive a movement input in a direction relative to the first location. The movement input can be defined by movement commands from the input device. The processor can receive a second input data point at a second location relative to the image data. The second input data point can be triggered by a second actuation of the input device. The processor can display, at the user interface, a graphical object representing the bounding box as an overlay of the image data. The bounding box can have corners defined by the first location and the second location. Edges (and angles thereof) of the bounding box can be defined by the direction of the movement input.

22 Claims, 8 Drawing Sheets

(56) References Cited

U.S. PATENT DOCUMENTS

| | | | |
|---|---|---|---|
| 2013/0238966 A1* | 9/2013 | Barrus | G06K 9/00449 |
| | | | 715/223 |
| 2017/0357418 A1* | 12/2017 | Dunn | G06F 3/04845 |
| 2018/0095632 A1* | 4/2018 | Leeman-Munk | G06N 3/04 |
| 2018/0113595 A1 | 4/2018 | Ptak et al. | |
| 2018/0137642 A1 | 5/2018 | Malisiewicz et al. | |
| 2018/0276182 A1* | 9/2018 | O'Donovan | G06F 8/34 |
| 2019/0004688 A1* | 1/2019 | Bowen | G06T 11/60 |

* cited by examiner

SYSTEM AND METHOD FOR ORIENTED BOUNDING BOX TOOL DEFINING AN ORIENTATION OF A TILTED OR ROTATED OBJECT

FIELD

The present disclosure generally relates to the field of artificial intelligence, computer vision, image processing, and interfaces.

INTRODUCTION

Embodiments described herein relate to training artificial intelligence systems for tasks using interface tools to define bounding boxes or volumes around objects or subjects of images. In order to train an artificial intelligence system for a particular task, such as a vision task, regions of images can be labelled by drawing bounding boxes (BB) around objects or subjects of images. In some cases, an oriented bounding box (OBB) is necessary to define an orientation for the object, but it can add complexities to the labeling task.

SUMMARY

In accordance with an aspect, there is provided a system for a bounding box tool. The system has a server having non-transitory computer readable storage medium with executable instructions for causing one or more processors to: display a user interface on a display of a device, the user interface displaying image data; activate a virtual tool to define a bounding box, the virtual tool controlled by commands received from an input device; display, at the user interface, an indicator for the virtual tool relative to the image data; receive a first input data point at a first location relative to the image data, the first input data point triggered by a first actuation of the input device; receive a movement input in a direction relative to the first location, the movement input defined by movement commands from the input device during the actuation of the input device and a release of the first actuation of the input device; receive a second input data point at a second location relative to the image data, the second input data point triggered by a second actuation of the input device; compute the bounding box in a bounding box format using the first input data point, the movement input, and the second input data point, wherein the bounding box format defines a first corner at the first location, an opposite corner at the second location, and an adjacent corner connected to the first corner by an edge at an angle defined by the movement input; automatically generate a new data file for storing, at a data store, the bounding box in the bounding box format; automatically generate a graphical object representing the bounding box using the new data file; display, at the user interface, the graphical object representing the bounding box as an overlay of the image data, the bounding box having corners defined by the first location and the second location, the bounding box having edges connecting the corners, the edges defined by the direction of the movement input.

In accordance with an aspect, there is provided a system for a bounding box tool. The system can have a server having non-transitory computer readable storage medium with executable instructions for causing one or more processors to: display a user interface on a display of a device, the user interface displaying image data; activate a virtual tool to define a bounding box, the virtual tool controlled by commands received from an input device; display, at the user interface, an indicator for the virtual tool relative to the image data; receive a first input data point at a first location relative to the image data, the first input data point triggered by a first actuation of the input device; receive a movement input in a direction relative to the first location, the movement input defined by movement commands from the input device during the actuation of the input device and a release of the first actuation of the input device; receive a second input data point at a second location relative to the image data, the second input data point triggered by a second actuation of the input device; display, at the user interface, a graphical object representing the bounding box as an overlay of the image data, the bounding box having corners defined by the first location and the second location, the bounding box having edges connecting the corners, the edges defined by the direction of the movement input.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DETAILED DESCRIPTION

Embodiments of methods, systems, and apparatus are described through reference to the drawings.

Embodiments described herein relate to training artificial intelligence systems for tasks (e.g. vision tasks) using interface tools to define bounding boxes or volumes around objects or subjects of images. Training systems for vision tasks can involve labelling regions of images by drawing bounding boxes (BB) around objects or subjects of images. A BB can be a cuboid (in three dimensions) or a rectangle (in two dimensions) containing the object. That is, a BB is a volume that bounds or encapsulates one or more objects. An example vision task is object collision detection. Intersection of two BBs can indicate a collision of two objects, for example. The BB can be tight around the objects or subjects.

A BB can be aligned with the axes of the coordinate system (for the interface) and it can be referred to as an axis-aligned bounding box (AABB). The AABB can be a rectangular 4-sided box in two dimensions and 6-sided box in three dimensions categorized by having its faces oriented along the coordinate system. An AABB can be a rectangular box whose face normals are parallel to the axes of the coordinate system.

Figure 1:
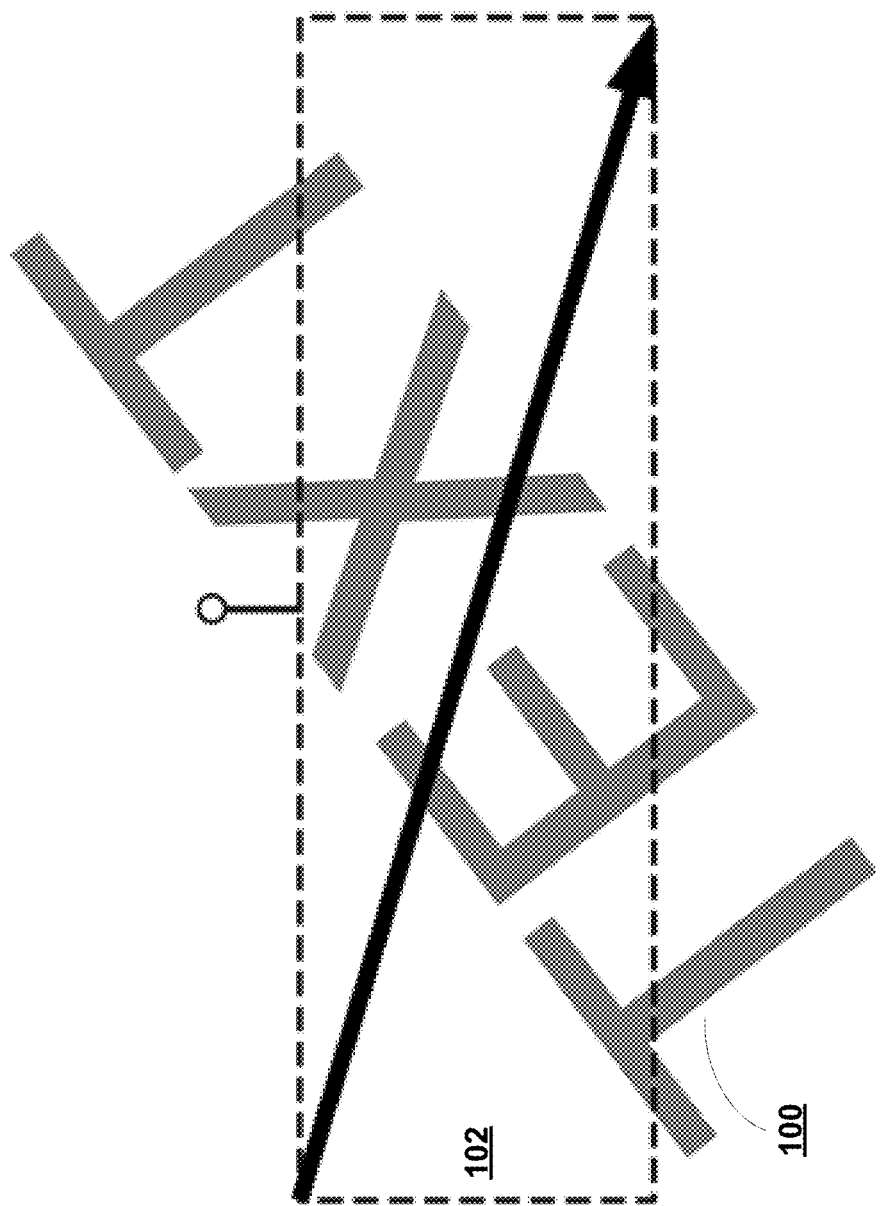
FIG. 1 is a diagram of an example bounding box displayed at an interface.

An oriented bounding box (OBB) is an arbitrarily oriented rectangular bound so that it uses an object's local coordinate system. In some cases, an OBB is necessary to define an orientation for the object such as if the object is tilted or rotated. For example, FIG. 1 shows an interface with an image of a tilted TEXT object 100 to label. An OBB can add complexities to the labeling and vision task. For example, to detect collisions of objects the BBs for the object can be expressed within a common coordinate system. The objects may not have a common orientation and the OBBs may need to be converted for a particular vision task, for example. OBBs can provide models that are rotation-invariant or models that do not need to learn to detect objects that are oriented in multiple angles. For instance, OCR models can be simplified when they can assume that characters are laid out on an imaginary horizontal line in an image.

Figure 2:
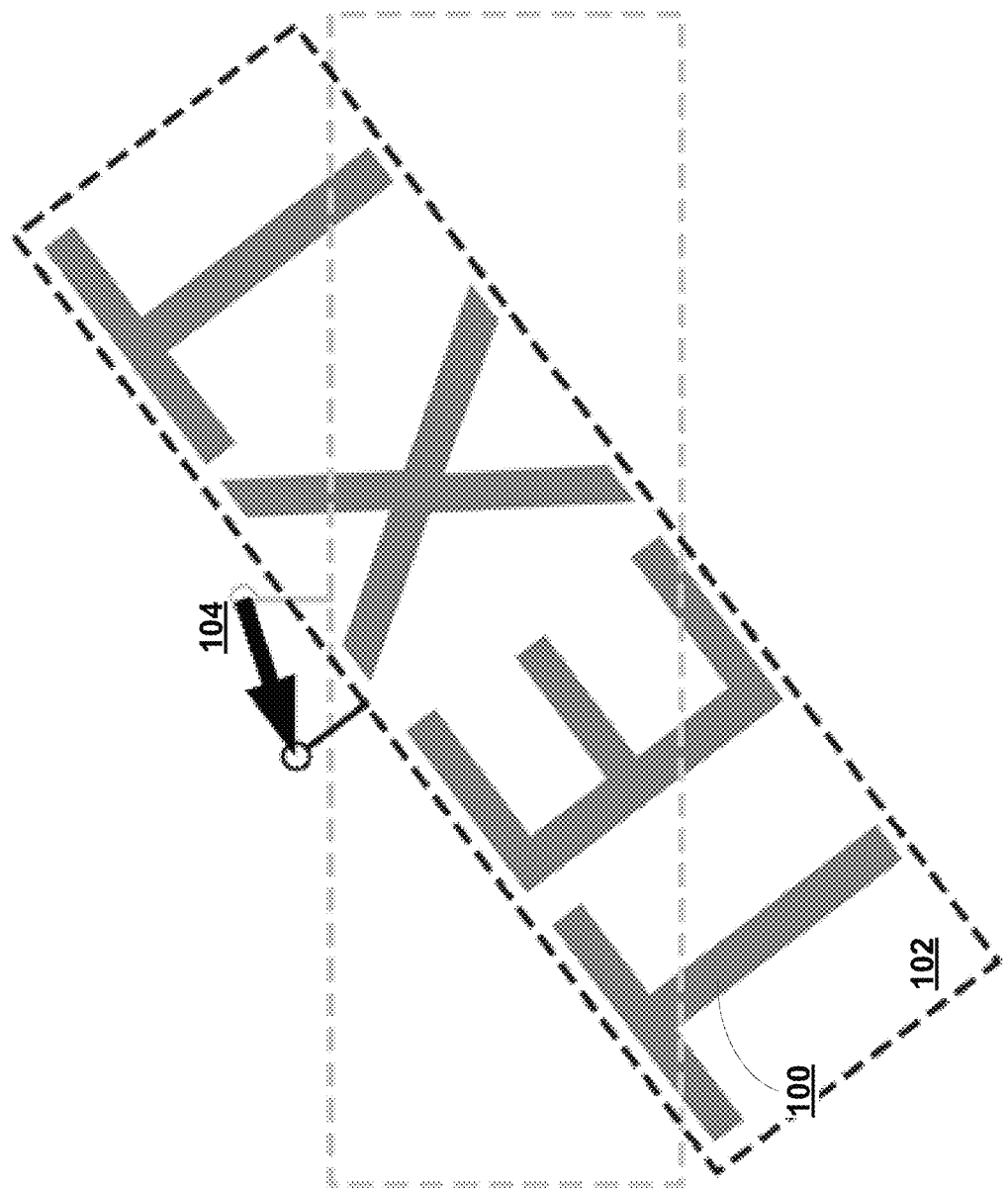
FIG. 2 is a diagram of an example bounding box displayed at an interface.

An example workflow to draw an OBB using an interface tool can be similar to drawing a rectangle, for example. An interface tool might not be well adapted to the labeling task, making it inefficient. When labeling tasks consist of drawing thousands of boxes, time efficiency becomes important. An example workflow can involve two steps. First, the user can actuate an input device (e.g. press down the mouse button) to trigger the interface tool to define one corner of the BB 102. Next, the user can drag the input device and release the actuation to define the opposite corner of the BB 102 to define an AABB. Second, the user can actuate the input device to rotate the BB 102 to try to align it with the TEXT object 100 orientation, such as using a handle 104 of the interface (FIG. 2). The rotated BB 102 can be referred to as an OBB as it is oriented to the object's local coordinate system.

In order to end up with the correct BB 102 (e.g. correctly aligned to the orientation of the TEXT object 102 and correct horizontal and vertical dimensions to contain the TEXT object 102), the user would have to guess at the first step the desired horizontal and vertical dimensions, as well as its horizontal and vertical center position, without any landmark. If BB 102 is not correct (which is common given the visual estimation required by this method) then the user must subsequently adjust each side, one by one. This can be inefficient.

Embodiments described herein provide an improved interface tool for drawing or defining a BB. For example, the improved method can enable drawing or defining an OBB using "one-shot" or user actuation of an input tool. The improved method can result in few or no subsequent adjustments.

Figure 3:
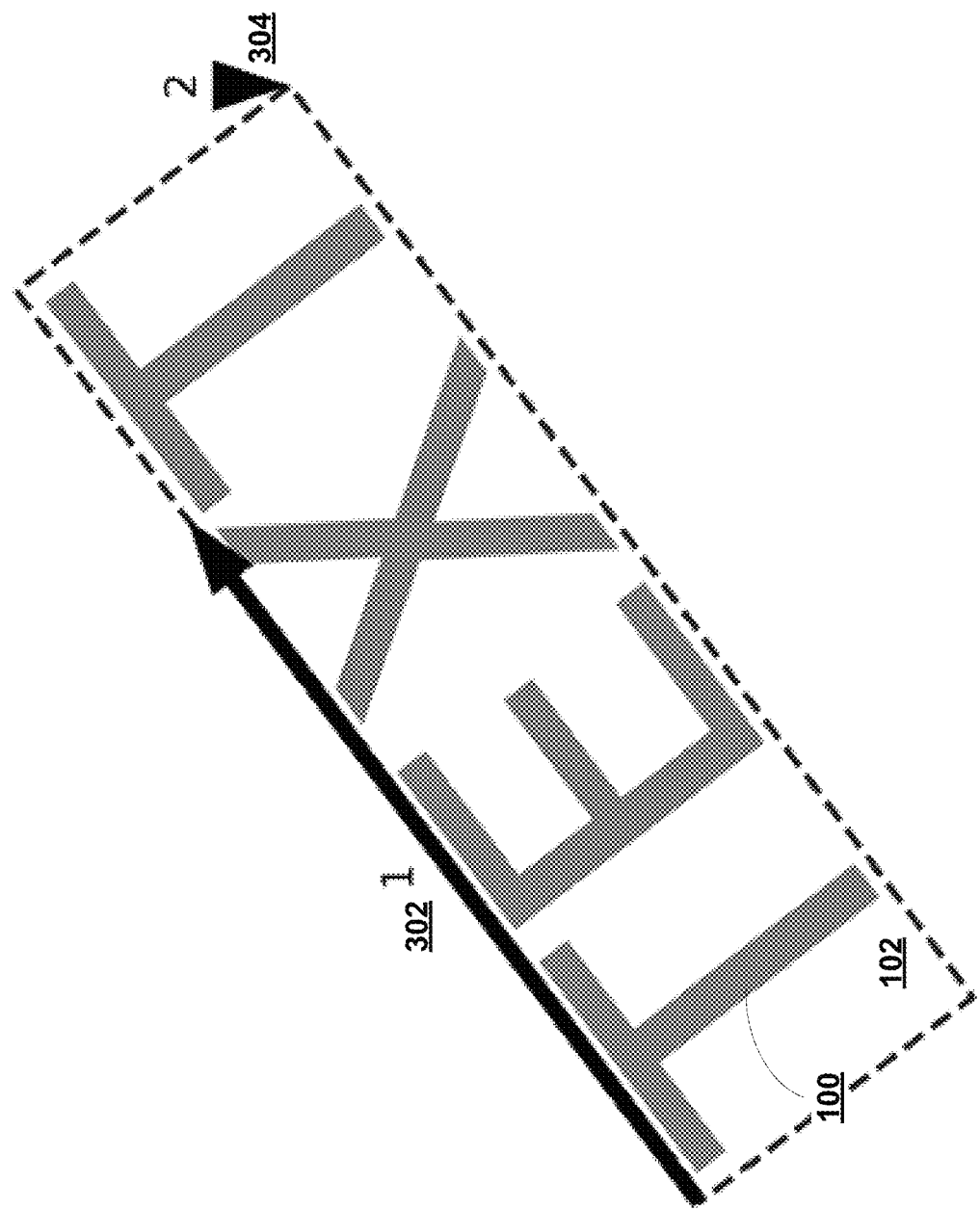
FIG. 3 is a diagram of an example tool and bounding box according to embodiments described herein.

FIG. 3 shows an interface with a tilted TEXT object 100 to label using an improved virtual tool configured to define an OBB 102 according to some embodiments. The virtual tool can be controlled (e.g. actuated, moved) by an input device. The virtual tool can be used to capture input data for defining the OBB 102. The input device can be a computer mouse, for example. The input device can be integrated with a touch sensitive display or surface, as another example. The user can interact with the input device using various gestures or movements to actuate the device. For example, the user can press down a mouse button (click) and drag or move the mouse to a location on the interface or image displayed thereon. As another example, the user can touch a touch sensitive display or surface and swipe his or her finder across the display or surface.

The workflow can involve two well-integrated steps. First, the user can actuate an input device (e.g. press down the mouse button) to trigger the interface tool to define one corner of the BB 102. Then the user can drag the input tool and release the actuation of the input device to define the angle of one edge of the BB 102. Second, the user can actuate the input device (e.g. click the mouse button) to define the opposite corner of the BB 102 to produce an OBB. The workflow can involve the following example gestures by the user can define the input data: click, drag, click; or touch, swipe, touch. The input device can have different hardware form factors to enable different gestures for the input data. For example, the input device can be integrated with a touch sensitive display device or surface. As another, example, the input device can be a computer mouse. The input device can have actuating buttons or gesture response. The input device can be dynamically adapted to different input tools to receive input data points. As another example, the input device can have natural motion gesture-based sensors for receiving input data. This can be in three dimensions, such as, remote gesture device, virtual reality device, depth camera, camera, stereo camera, and so on.

The example BB 102 around text 100 can be defined by a first input data point (for a first corner location), a movement input 302 of the virtual tool (for the edge angle), and a second input data point 304 (for the second corner location).

The interface can provide a virtual (drafting or bounding box) tool. The interface can receive a command for activation of the virtual tool to define the BB 102 and display the BB 102 as a graphical object of the interface. The interface can display an image (or more generally image data) and the virtual tool can move to different locations within the image to define a bounding box as an overlay of the image. That is, the bounding box can be defined using the virtual tool and displayed at the interface as a graphical object overlayed on the image. The location of the virtual tool within the interface can be controlled by the input device. The input device can also transmit commands to control, actuate, or manipulate the virtual tool. Movement of the input device can trigger corresponding movement of the virtual tool. Actuation of the input device can trigger a command for the virtual tool. The first actuation of the input device can be referred to as a first input data point at a first location. The drag or movement of the input device can be referred to as movement or direction input which can be defined relative to the first input data point. The second actuation of the input device can be referred to as a second input data point at a second location. The first input data point at the first location can define the first corner of the BB 102. The movement input from the first location can define the edge angle of the BB 102. The second input data point at the second location can define another (opposite) corner of the BB 102. The other corner is opposite the first corner of the BB 102. If the user selected the adjacent corner with the second input (click) by accident this can result in a BB 102 (e.g. OBB) that would collapse to a line. Since this is unlikely to be usable, embodiments described herein can disallow the second click if the box height is not greater than a threshold e.g. a few pixels and/or a percentage of the width, for example.

Figure 4:
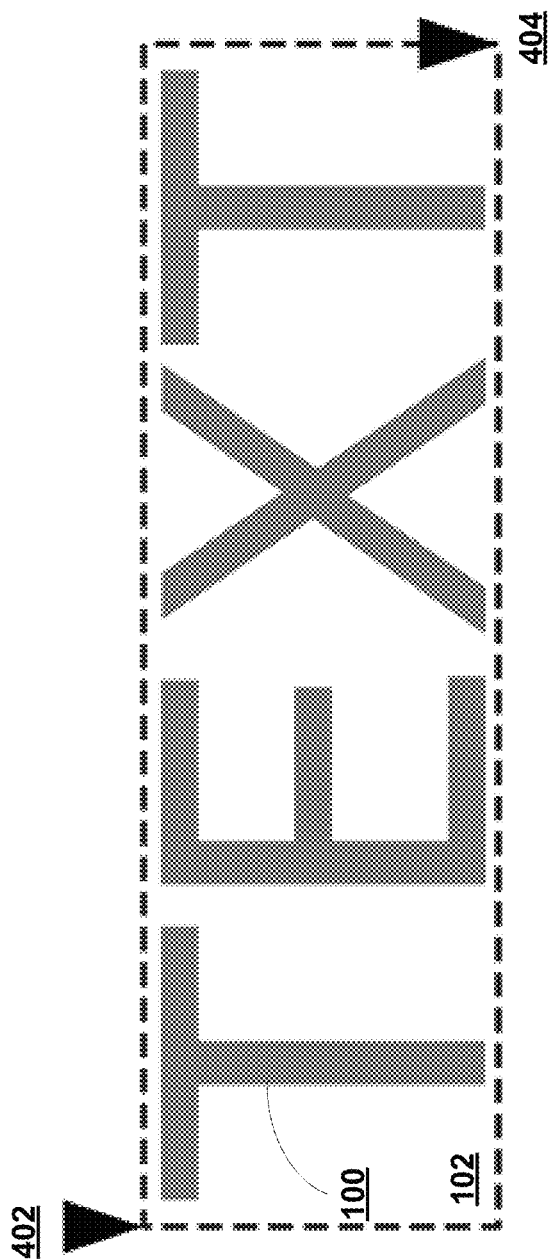
FIG. 4 is a diagram of an example tool and bounding box according to embodiments described herein.

The method can also enable drawing or defining an AABB using the same technique. FIG. 4 shows an interface with a tilted TEXT object 100 to label using the improved method to define an AABB. At 402, the user actuates the input device (e.g. press down the mouse button) to trigger the interface (or virtual) tool to define one corner of the BB 102. In this example, the user does not drag the input device and the default angle is computed as null. At 404, the user can actuate the input device (e.g. click the mouse button) to define the opposite corner of the BB 102 to produce an AABB.

During the first step, while the user moves (e.g. drags, swipes) the input device to define the first edge, the interface can dynamically update to display a line between the corner and the location of the virtual tool (e.g. which can be displayed as a cursor), soon to become an edge of the BB. Then, until the second actuation of the input device (e.g. to define the second input data point), the suggested box can be displayed. The suggested box can be defined based on a current location of the virtual tool (e.g. the current position of a cursor before the actuation). The displayed BB can be set or frozen when the user actuates the input device to capture the second input data point and define the (second) corner.

The user can have the freedom to start by any of the four corners, and then to drag the input device to any of the two possible adjacent edges. In practice, the angle of the first edge drawn can be wrapped between −45° and 45°. The width and height can be exchanged if the angle has been wrapped by an odd number of quadrants.

Embodiments described herein provide an improved virtual tool for an interface to improve the workflow for a user to draw an OBB around a region of an image. The tool can also be used to define an AABB using the improved workflow to provide flexibility and avoid requiring the user to use different workflows for OBBs and AABBs. The OBB can be used for subsequent vision tasks (or other tasks). The OBB can be saved in different data formats. For example, an example format for an OBB is "angle-center-extent", consisting of the angle, the center coordinates, and the extent (half-width and half-height). To extract the region of interest from an image, one can rotate the image around the OBB's center by the opposite of the OBB's angle, before cropping the image from pixel center-extent to pixel center+extent.

Figure 8:
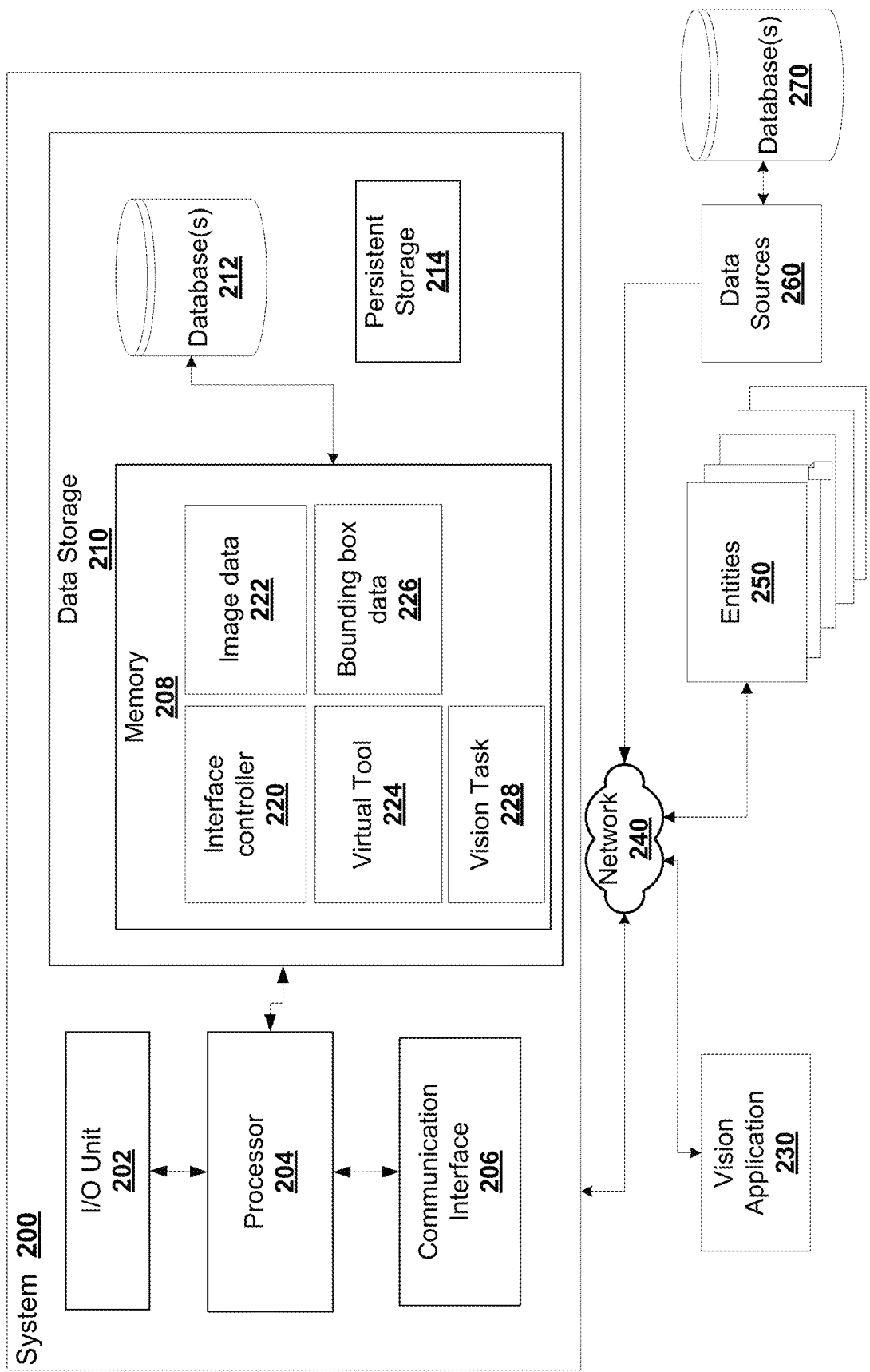
FIG. 8 is a diagram of an example system for a bounding box tool according to embodiments described herein.

FIG. 8 is a diagram of a system 200 for generating an interface with a virtual tool for BBs and an example physical environment.

The system 200 can include an I/O Unit 102, a processor 104, communication interface 106, and data storage 110. The processor 104 can execute instructions in memory 108 to implement aspects of processes described herein. The processor 104 can execute instructions in memory 108 to configure an interface controller 220 for generating and managing the interface for displaying image data 222, a virtual tool 224 for defining BBs and generating bounding box data 226, and other functions described herein. The system 200 may be software (e.g., code segments compiled into machine code), hardware, embedded firmware, or a combination of software and hardware, according to various embodiments.

In some embodiments, the system 200 can implement one or more vision tasks 228 using the image data 222 and bounding box data 226. In some embodiments, the system 200 can connect to one or more vision applications 230 that can use the bounding box data 226 to define regions with the image data 222 for various tasks. In some embodiments, the vision task 228 can be integrated with the vision application 230 to exchange data and control commands. In some embodiments, the system 200 can connect to one or more entities 250 that can implement different image related processes, that can receive image data 222 and bounding box data 226, and/or that can display the interface with virtual tool 224, for example. The system 200 can connect to data sources to receive image data 222, for example.

The I/O unit 102 can enable the system 100 to interconnect with one or more input devices, such as a keyboard, mouse, camera, touch screen and a microphone, and/or with one or more output devices such as a display screen and a speaker. An input device can be used to control the virtual tool 224 at the interface and define bounding box data 226 relative to image data 222 displayed at the interface. The input device can be used to generate touch input data and movement data, for example.

The interface controller 220 can trigger the display of a user interface on a display device. The user interface can display an image (or a portion thereof) from image data 222. The user interface can enable selection of the image (or a portion thereof) from image data 222. The interface controller 220 can activate the virtual tool 224 at the interface to define a BB. The virtual tool 224 can be controlled by commands received from interaction between the input device and the interface. The interface controller 220 can trigger the display of an indicator for the virtual tool relative to the image data. The virtual tool 224 can be displayed as a graphical object such as a pointer, marker, and the like. The interface controller 220 can trigger the display of a graphical representation of a source image and a graphical representation of the indicator for the virtual tool relative to the image data.

The interface controller 220 can receive, from the interface, a first input data point at a first location relative to the image (or a portion thereof). The capture of the first input data point data can be triggered by actuation of the input device. This can be a click, selection, or a touch of the input device, for example. The first input data point can define a corner location for the BB. The input device can be integrated with a touch display, for example, and the first input data point can be referred to as a first touch input.

The interface controller 220 can receive, from the interface, movement input in a direction relative to the first location. The movement input can be defined by movement commands from the input device during the actuation of the input device and a release of the actuation of the input device. This can be a drag or swipe from the first corner location, for example. The movement input can define an edge angle from (and relative to) the corner location. The movement input can be in the direction of the adjacent corner for the BB, for example.

The interface controller 220 can receive, from the interface, a second input data point at a second location relative to the image. The capture of the second input data point can be triggered by actuation of the input device. This can be a click, selection, or a touch of the input device, for example. The second input data point can define another corner location for the BB. The second input data point can define the location of the opposite corner to the first corner of the BB, for example.

The interface controller 220 can trigger display, at the interface, of a graphical object representing the BB as an overlay of the image data. The BB corners are defined by the first location and the second location. In particular, the first location indicates a corner of the BB and the second location can indicate the opposite corner of the BB. The BB has edges connecting adjacent corners. The edges can be defined by the direction of the movement input, and in particular, the angle of the edges relative to adjacent corners can be based on the movement input.

The interface controller 220 can receive the input data from the interface and transform the input data into a BB data format. The interface controller 220 can compile the input into code representing the BB data format. The transformed input data can define a BB record. The BB record can be linked with the image. For example, the BB record can include metadata that includes an image identifier, for example. The interface can store the BB record as bounding box data 226. Different metadata can be stored in association with the BB. For example, the metadata can be the actual text written in the box if it is assumed to be text, the class of object e.g. car, truck, human, information about the BB itself e.g. partial, occluded, and so on.

The BB data format can be an OBB data format. The BB data format can be an AABB data format. The OBB format is a superset of the AABB format that contains an orientation component that can be expressed in multiple ways e.g. angle, distance, vector; the format can simply be the 3 locations and thus have implicit orientation encoded. For example, the following are the computations that can be implemented by interface controller 220 to convert user inputs into an "angle-center-extent" OBB data format.

The interface can receive a command from the input device indicating actuation of virtual tool 224 (e.g. first input data point) at a first location and movement of the virtual tool 224 from the first location to another location (movement input) while the virtual tool 224 is continuously actuated (e.g. click, hold click while dragging input device to a new location). For example, the input data can be defined as a first click of the input device and drag of the virtual tool 224 from $P_{1,start}$ to $P_{1,end}$. The interface can receive a command indicating that the virtual tool 224 is released (e.g. no longer actuated). The interface can receive another command indicating another actuation of the virtual tool 224 (e.g. second input data point) at a second location. For example, the input data can be defined as a second click at $P_2$. The interface can provide the input data to the interface controller 220 to compute the BB.

The interface controller 220 can use the input data to compute the BB angle θ (e.g. angle of the edge between adjacent corners). The angle of first drag can be computed as follows:

$$A := P_{1,end} - P_{1,start}$$

$$\angle A := a\tan 2(A_y, A_x)$$

The interface controller 220 can wrap the angle between −45° and 45°

$$\theta := ((\angle A + 45°) \bmod 90°) - 45°$$

The interface controller 220 can compute the BB center coordinates C:

$$C := \frac{P_{1,start} + P_2}{2}$$

The interface controller 220 can compute the BB extent E (half-width, half-height). For example, the interface controller 220 can compute the BB extent E by computing the diagonal from center to $P_2$, or alternatively half the full diagonal.

$$E := P_2 - C = \frac{P_2 - P_{1,start}}{2}$$

If θ is different from 0, the interface controller 220 can rotate E in the opposite angle −θ. This can be a change of basis towards a basis defined by the first input data point (click) and movement input (drag). This can be performed by multiplying a rotation matrix.

$$E := \begin{bmatrix} \cos(-\theta) & -\sin(-\theta) \\ \sin(-\theta) & \cos(-\theta) \end{bmatrix} E = \begin{bmatrix} \cos(\theta) & \sin(\theta) \\ -\sin(\theta) & \cos(\theta) \end{bmatrix} E$$

The interface controller 220 can take the absolute value of each coordinate $$E := \begin{bmatrix} |E_x| \\ |E_y| \end{bmatrix}$$

Considering an example with the origin (e.g. first input data point) at the bottom-left corner, the following indicates computations for the OOBB example depicted in FIG. 3.

The interface controller 220 can receive the following input data from actuation and movement of the virtual tool 224. The first input data point and the movement data can be:

$$P_{1,start} = \begin{bmatrix} 2 \\ 64 \end{bmatrix} \text{ to } P_{1,end} = \begin{bmatrix} 122 \\ 154 \end{bmatrix}$$

The second input data point can be:

$$P_2 = \begin{bmatrix} 198 \\ 136 \end{bmatrix}$$

The interface controller 220 can compute the BB angle θ by computing the angle of the first drag (movement of the virtual tool 224 within the interface)

$$A := \begin{bmatrix} 122 \\ 154 \end{bmatrix} - \begin{bmatrix} 2 \\ 64 \end{bmatrix} = \begin{bmatrix} 120 \\ 90 \end{bmatrix}$$

$$\angle A := \operatorname{atan2}(90, 120) \approx 37, 9°$$

As shown, wrapping the angle between −45° and 45° does not have an effect $$\theta := ((36.9° + 45°) \bmod 90°) - 45° = (81.9° \bmod 90°) - 45° = 81.9° - 45° = 36.9°$$

The interface controller 220 can compute BB center coordinates C:

$$C := \frac{\begin{bmatrix} 2 \\ 64 \end{bmatrix} + \begin{bmatrix} 198 \\ 136 \end{bmatrix}}{2} = \begin{bmatrix} 100 \\ 100 \end{bmatrix}$$

The interface controller 220 can compute BB extent E (half-width, half-height). For example, the interface controller 220 can compute diagonal from center to $P_2$ $$E := \begin{bmatrix} 198 \\ 136 \end{bmatrix} - \begin{bmatrix} 100 \\ 100 \end{bmatrix} = \begin{bmatrix} 98 \\ 36 \end{bmatrix}$$

The interface controller 220 can rotate E in the opposite angle $-\theta$.

$$E := \begin{bmatrix} 0,8 & 0,6 \\ -0,6 & 0,8 \end{bmatrix} \begin{bmatrix} 98 \\ 36 \end{bmatrix} = \begin{bmatrix} 100 \\ -30 \end{bmatrix}$$

The interface controller 220 can take the absolute value of each coordinate.

$$E := \begin{bmatrix} |E_x| \\ |E_y| \end{bmatrix} = \begin{bmatrix} 100 \\ 30 \end{bmatrix}$$

Figure 5:
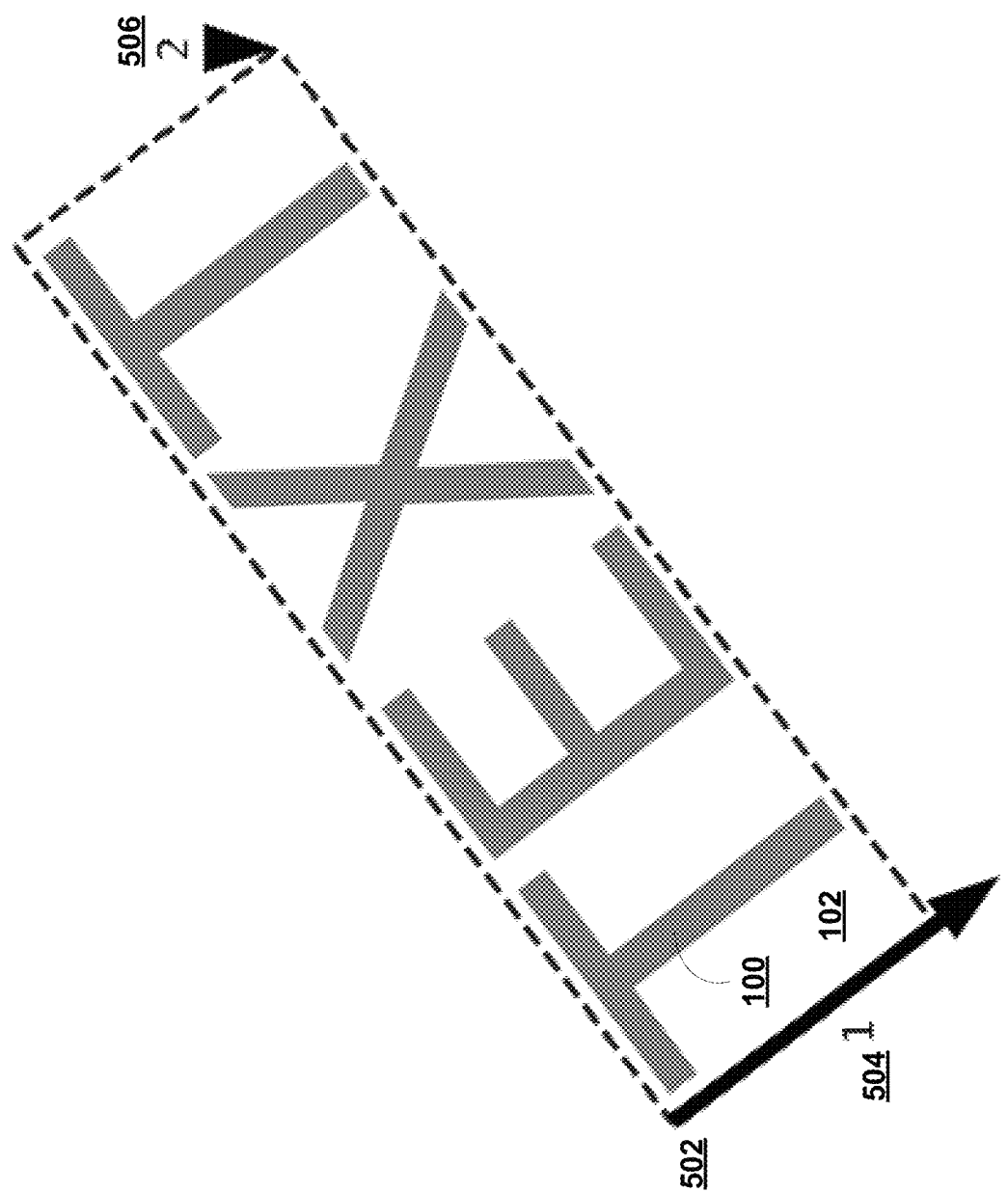
FIG. 5 is a diagram of an example tool and bounding box according to embodiments described herein.

The virtual tool 224 may draw or define the same OOBB by specifying the same two corners but the virtual tool 224 can be dragged to define the other edge. That is, different orders of input data points can be used to define the same OOBB. FIG. 5 illustrates an example BB 102 around text 100 that can be defined by a first input data point 502 (for a first corner location), a movement input 504 of the virtual tool 224 (for the edge angle), and a second input data point 506 (for the second corner location). The difference in computation can be limited to up until the angle is wrapped between $-45°$ and $45°$.

From the control commands generated at interface using the virtual tool 224, the interface controller 220 can receive the following example input data. The interface controller 220 can receive the first input data point (click) and movement input (drag) of the virtual tool 224 from $$P_{1,start} = \begin{bmatrix} 2 \\ 64 \end{bmatrix} \text{ to } P_{1,end} = \begin{bmatrix} 47 \\ 4 \end{bmatrix}$$

The interface controller 220 can receive the second input data point (click) at $P_2 =$ $$P_2 = \begin{bmatrix} 198 \\ 136 \end{bmatrix}$$

The interface controller 220 can compute the BB angle $\theta$. The interface controller 220 can compute the angle of first movement input (drag)

$$A := \begin{bmatrix} 47 \\ 4 \end{bmatrix} - \begin{bmatrix} 2 \\ 64 \end{bmatrix} = \begin{bmatrix} 45 \\ -60 \end{bmatrix}$$

$$\angle A := \operatorname{atan2}(-60, 45) \approx -53,1°$$

Wrapping the angle between $-45°$ and $45°$ can compute the same angle as the example described in relation to FIG. 3.

$$\theta := ((-53.1° + 45°) \bmod 90°) - 45° = (-8.1° \bmod 90°) - 45° = 81.9° - 45° = 36.9°$$

Figure 6:
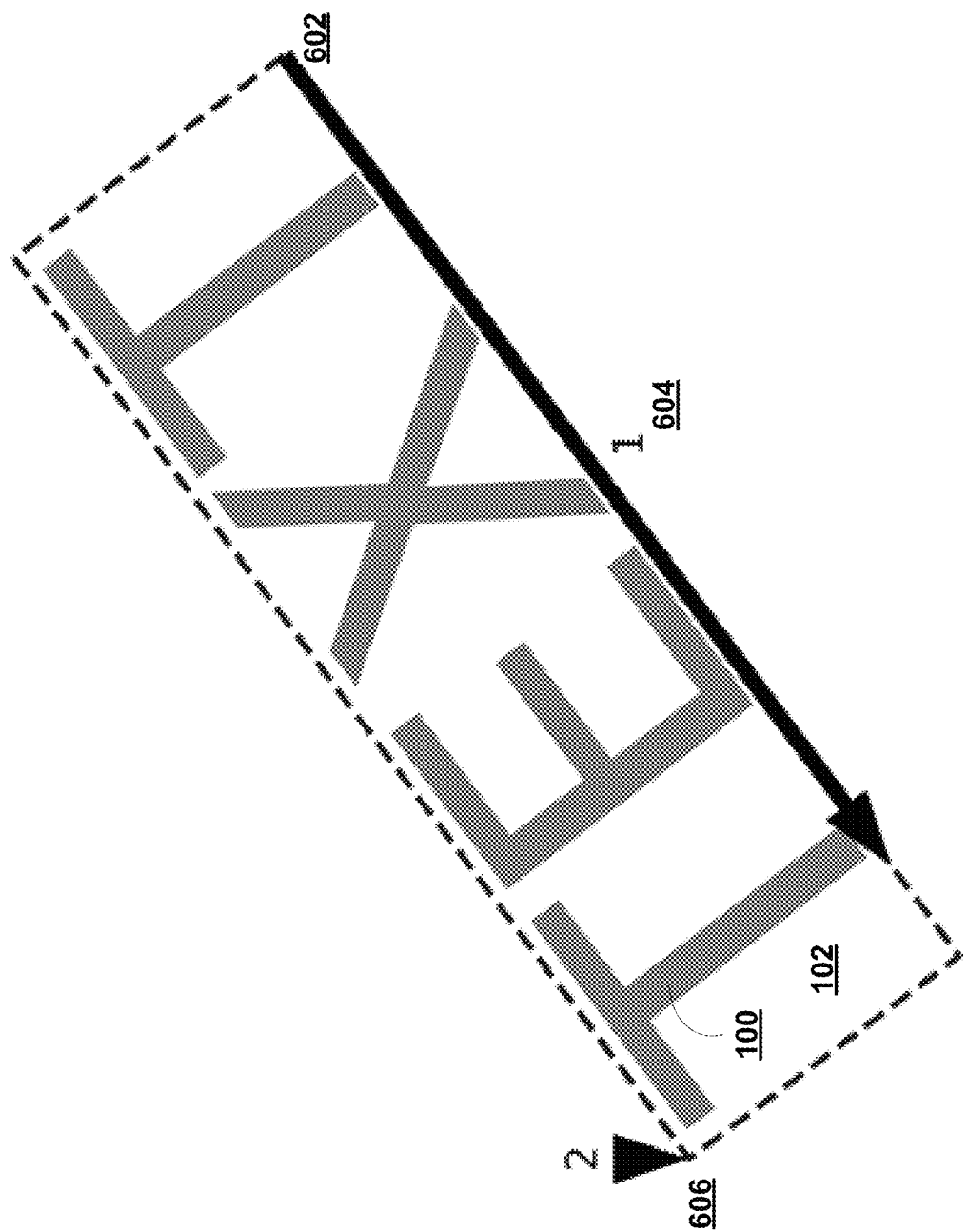
FIG. 6 is a diagram of an example bounding box around text.

The virtual tool 224 may draw or define the same OOBB by starting by a completely different corner (e.g. the first input data point can be at a different corner location). The difference in computation carries up until the absolute value is finally performed on the extent. FIG. 6 illustrates an example BB 102 around text 100 that can be defined by a first input data point 602 (for a first corner location), a movement input 604 of the virtual tool 224 (for the edge angle), and a second input data point 606 (for the second corner location).

From the control commands generated at interface using the virtual tool 224, the interface controller 220 can receive the following example input data. The interface controller 220 can receive the first input data point (click) and movement input (drag) of the virtual tool 224 from $$P_{1,start} = \begin{bmatrix} 198 \\ 136 \end{bmatrix} \text{ to } P_{1,end} = \begin{bmatrix} 54 \\ 28 \end{bmatrix}$$

The interface controller 220 can receive the second input data point (click) at $$P_2 = \begin{bmatrix} 2 \\ 64 \end{bmatrix}$$

The interface controller 220 can compute the BB angle $\theta$. The interface controller 220 can compute the angle of first movement input (drag)

$$A := \begin{bmatrix} 54 \\ 28 \end{bmatrix} - \begin{bmatrix} 198 \\ 136 \end{bmatrix} = \begin{bmatrix} -144 \\ -108 \end{bmatrix}$$

$$\angle A := \operatorname{atan2}(-108, -144) \approx -143,1°$$

Wrapping the angle between $-45°$ and $45°$ can return the same angle $$\theta := ((-126.9° + 45°) \bmod 90°) - 45° = (-98.1° \bmod 90°) - 45° = 81.9° - 45° = 36.9°$$

The interface controller 220 can compute the BB center coordinates C:

$$C := \frac{\begin{bmatrix} 198 \\ 136 \end{bmatrix} + \begin{bmatrix} 2 \\ 64 \end{bmatrix}}{2} = \begin{bmatrix} 100 \\ 100 \end{bmatrix}$$

The interface controller 220 can compute the BB extent E (half-width, half-height). The interface controller 220 can compute the diagonal from center to $P_2$ which indicates coordinates with signs that are different, but consistent $$E := \begin{bmatrix} 2 \\ 64 \end{bmatrix} - \begin{bmatrix} 100 \\ 100 \end{bmatrix} = \begin{bmatrix} -98 \\ -36 \end{bmatrix}$$

The interface controller 220 can rotating E in the opposite angle −θ.

$$E := \begin{bmatrix} 0,8 & 0,6 \\ -0,6 & 0,8 \end{bmatrix} \begin{bmatrix} -98 \\ -36 \end{bmatrix} = \begin{bmatrix} -100 \\ +30 \end{bmatrix}$$

The interface controller 220 can compute the absolute value of each coordinate which returns the same extents.

$$E := \begin{bmatrix} |E_x| \\ |E_y| \end{bmatrix} = \begin{bmatrix} 100 \\ 30 \end{bmatrix}$$

Accordingly, the virtual tool 224 provides a flexible tool to define BB based on a set of input data that can define different corners and edge angles for the BB. The input data can be efficiently provided by the user to the system 200.

The processor 204 can save a bounding box record (as part of the bounding box data 226) for the bounding box with metadata with an identifier for the image data that was displayed at interface with the bounding box was defined using the virtual tool 224.

The processor 204 can compute the bounding box in a bounding box format using the first input data point, the movement input, and the second input data point. For example, the format can define a first corner at the first location, an opposite corner at the second location, and an adjacent corner connected to the first corner by an edge at an angle defined by the movement input. As another example, the bounding box format is an angle-center-extent format defined by an angle of an edge between a corner and an adjacent corner, centre coordinates of the bounding box, and an extent of the bounding box.

The movement input can be from the first location towards an adjacent corner. Accordingly, the direction of the movement input being towards an adjacent corner of the bounding box. The second location can indicate the opposite corner.

The processor 204 can dynamically update the interface to display a line between the first location and a current location of the virtual tool when defining the movement input. The processor 204 can dynamically update the interface to display a suggested bounding box defined by the first location, the movement input and a current location of the virtual tool when defining the second input data point and prior to the second actuation of the input device.

The processor 204 can extract a region of interest from the image data defined by the bounding box, and save the extracted region of interest in data storage 110 as part of the image data 222. The processor 204 can transmit the extracted region to vision task 228, vision application 230, or entity 250, for example.

The processor 204 can be, for example, any type of general-purpose microprocessor or microcontroller, a digital signal processing (DSP) processor, an integrated circuit, a field programmable gate array (FPGA), a reconfigurable processor, or any combination thereof.

Memory 208 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 210 can include memory 208, databases 122 (e.g. graph database), and persistent storage 214.

The communication interface 206 can enable the system 200 to communicate with other components, to exchange data with other components, to access and connect to network resources, to serve applications, and perform other computing applications by connecting to a network 240 (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these.

The system 200 can be operable to register and authenticate users (using a login, unique identifier, and password for example) prior to providing access to applications, a local network, network resources, other networks and network security devices. The system 200 can connect to different machines, entities 250, and/or data sources 260 (linked to databases 270).

The data storage 210 may be configured to store information associated with or created by the system 200, such as for example image data 222 and bounding box data 226. The data storage 210 may be a distributed storage system, for example. The data storage 210 can implement databases, for example. Storage 210 and/or persistent storage 114 may be provided using various types of storage technologies, such as solid state drives, hard disk drives, flash memory, and may be stored in various formats, such as relational databases, non-relational databases, flat files, spreadsheets, extended markup files, and so on.

Figure 7:
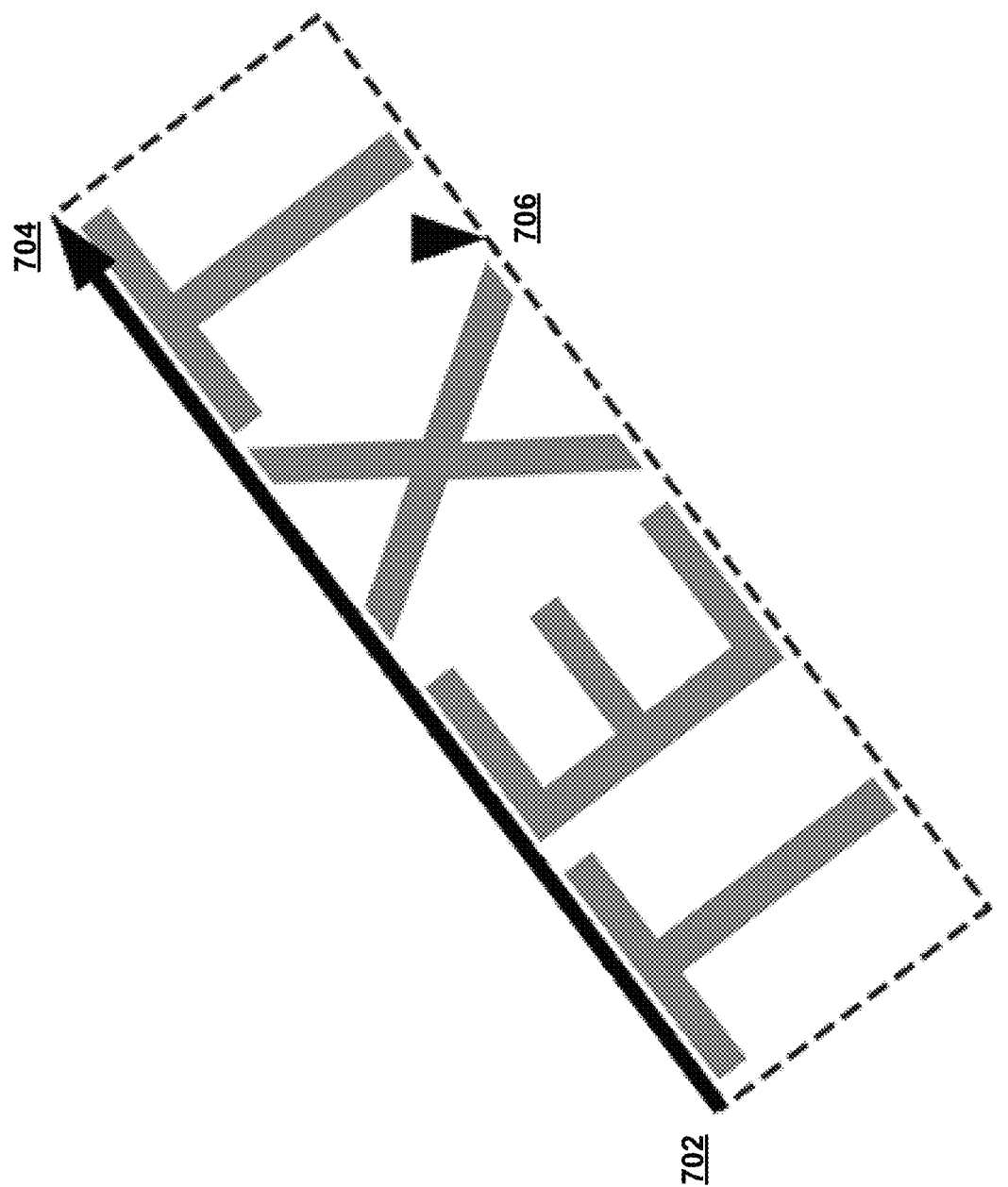
FIG. 7 is a diagram of an example bounding box.

FIG. 7 is a diagram of another example OBB that can be defined using a three-step workflow. Embodiments described herein provide an improved workflow and this three-step workflow is described for contrast. The three-step workflow involves two clicks to define two adjacent corners (e.g. corners 702, 704) and a third click defines the perpendicular dimension 706 of the BB. This three-step workflow requires additional actuations of the input device than the improved workflow of embodiments described herein. Further, the three-step workflow does not easily allow for an AABB, necessitating a different tool or workflow. In contrast, embodiments described herein can be used to define different types of BB such as an OBB and an AABB, avoiding the need for different tools.

The discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for providing a bounding box tool adapted for supporting a plurality of time-efficient machine learning labeling tasks conducted by a user of the bounding box tool for defining labels around visual objects that have a tilt or rotation relative to a local coordinate system without requiring subsequent adjustments to accommodate the tilt or the rotation, the system comprising:
a server having a non-transitory computer readable storage medium with executable instructions for causing one or more processors to:
display a user interface on a display of a device, the user interface displaying image data;
activate a virtual tool to define a bounding box, the virtual tool controlled by commands received from an input device;
display, at the user interface, an indicator for the virtual tool relative to the image data;
receive a first input data point at a first location relative to the image data, the first input data point triggered by a first actuation of the input device;
receive a movement input in a direction relative to the first location, the movement input defined by movement commands from the input device during the first actuation of the input device and a release of the first actuation of the input device, the movement input establishing, through a bounding box angle defined between the first actuation of the input device and the release of the first actuation of the input device, an edge angle relative to the first location representing an orientation component of the bounding box representative of the tilt or rotation relative to the local coordinate system;
receive a second input data point at a second location relative to the image data, the second input data point triggered by a second actuation of the input device;
compute the bounding box in a bounding box format using the first input data point, the movement input, and the second input data point, the bounding box having corners connected by edges, the corners defined by the first input data point, the movement input, and the second input data point, the edges defined by the direction of the movement input, wherein the bounding box format defines a first corner at the first location, an opposite corner at the second location, and an adjacent corner connected to the first corner by an edge at the edge angle defined by the movement input;
automatically generate a new data file for storing, at a data store, the bounding box in the bounding box format;
automatically generate a graphical object representing the bounding box using the new data file including, either explicitly or implicitly, the orientation component of the bounding box; and
render display, at the user interface, of the graphical object representing the bounding box as an overlay of the image data, the bounding box having corners defined by the first location and the second location.

2. The system of claim 1 wherein the movement input is from the first corner of the bounding box at the first location, the direction of the movement input being towards an adjacent corner of the bounding box.

3. The system of claim 1 wherein the bounding box is an oriented bounding box, and wherein the new data file represents a label corresponding to a specific machine learning vision labeling task of the plurality of time-efficient machine learning labeling tasks such that the new data file is process-able to provide a rotation-invariant model for simplified machine learning.

4. The system of claim 1 wherein the processor is configured to dynamically update the interface to display a line between the first location and a current location of the virtual tool when defining the movement input.

5. The system of claim 1 wherein the processor is configured to dynamically update the interface to display a suggested bounding box defined by the first location, the movement input and a current location of the virtual tool when defining the second input data point and prior to the second actuation of the input device.

6. The system of claim 1 wherein the bounding box format is an angle-center-extent format defined by an angle of an edge between a corner and an adjacent corner, centre coordinates of the bounding box, and an extent of the bounding box.

7. The system of claim 1 wherein the processor is configured to extract a region of interest from the image data defined by the bounding box, and save the extracted region of interest in data storage.

8. The system of claim 1 wherein the processor is configured to store bounding box data on a non-transitory computer readable storage medium, the bounding box data including metadata with an identifier for the image data.

9. The system of claim 1, wherein the processor is configured to disallow receiving the second input data point if the second location leads to a box that is not greater than a predefined threshold.

10. The system of claim 1, wherein the processor is configured to combine the new data file for the bounding box with the image file for an image task profile.

11. A system for providing a bounding box tool adapted for supporting a plurality of time-efficient machine learning labeling tasks conducted by a user of the bounding box tool for defining labels around visual objects that have a tilt or rotation relative to a local coordinate system, without requiring subsequent adjustments to accommodate the tilt or the rotation, the system comprising:
a server having non-transitory computer readable storage medium with executable instructions for causing one or more processors to:
display a user interface on a display of a device, the user interface displaying image data;
activate a virtual tool to define a bounding box, the virtual tool controlled by commands received from an input device;
display, at the user interface, an indicator for the virtual tool relative to the image data;
receive a first input data point at a first location relative to the image data, the first input data point triggered by a first actuation of the input device;
receive a movement input in a direction relative to the first location, the movement input defined by movement commands from the input device during the first actuation of the input device and a release of the first actuation of the input device, the movement input establishing, through a bounding box angle defined between the first actuation of the input device and the release of the first actuation of the input device, an edge angle relative to the first location representing an orientation component of the bounding box representative of the tilt or rotation relative to the local coordinate system;
receive a second input data point at a second location relative to the image data, the second input data point triggered by a second actuation of the input device; and
display, at the user interface, a graphical object representing the bounding box as an overlay of the image data, the bounding box having corners defined by the first location and the second location, the bounding box having edges connecting the corners, the edges defined by the edge angle.

12. The system of claim 11 wherein the processor is configured to compute the bounding box in a bounding box format using the first input data point, the movement input, and the second input data point.

13. The system of claim 11 wherein the processor is configured to compute the bounding box in a bounding box format to define a first corner at the first location, an opposite corner at the second location, and an adjacent corner connected to the first corner by an edge at an angle defined by the movement input.

14. The system of claim 11 wherein the movement input is from the first location, the first location defining a first corner of the bounding box, the direction of the movement input being towards an adjacent corner of the bounding box.

15. The system of claim 11, further comprising automatically generating a new data file for storing, at a data store, the bounding box in a bounding box format, wherein the bounding box is an oriented bounding box and the new data file represents a label corresponding to a specific machine learning vision labeling task of the plurality of time-efficient machine learning labeling tasks such that the new data file is process-able to provide a rotation-invariant model for simplified machine learning.

16. The system of claim 11 wherein the processor is configured to dynamically update the interface to display a line between the first location and a current location of the virtual tool when defining the movement input.

17. The system of claim 11 wherein the processor is configured to dynamically update the interface to display a suggested bounding box defined by the first location, the movement input and a current location of the virtual tool when defining the second input data point and prior to the second actuation of the input device.

18. The system of claim 12 wherein the bounding box format is an angle-center-extent format defined by an angle of an edge between a corner and an adjacent corner, centre coordinates of the bounding box, and an extent of the bounding box.

19. The system of claim 11 wherein the processor is configured to extract a region of interest from the image data defined by the bounding box, and save the extracted region of interest in data storage.

20. The system of claim 11 wherein the processor is configured to store bounding box data on a non-transitory computer readable storage medium, the bounding box data including metadata with an identifier for the image data.

21. The system of claim 11 wherein the movement data can be in the direction of an adjacent edge to a corner at the first location.

22. A non-transitory computer readable storage medium storing machine-executable instructions, which when executed by one or more processors, cause the one or more processors to perform a method for providing a bounding box tool adapted for supporting a plurality of time-efficient machine learning labeling tasks conducted by a user of the bounding box tool defining labels around visual objects that have a tilt or rotation relative to a local coordinate system without requiring subsequent adjustments to accommodate the tilt or the rotation:
display a user interface on a display of a device, the user interface displaying image data;
activate a virtual tool to define a bounding box, the virtual tool controlled by commands received from an input device;
display, at the user interface, an indicator for the virtual tool relative to the image data;
receive a first input data point at a first location relative to the image data, the first input data point triggered by actuation of the input device;
receive a movement input in a direction relative to the first location, the movement input defined by movement commands from the input device during the first actuation of the input device and a release of the actuation of the input device, the movement input establishing, through a bounding box angle defined between the first actuation of the input device and the release of the first actuation of the input device, an edge angle relative to the first location representing an orientation component of the bounding box representative of the tilt or the rotation relative to the local coordinate system;

receive a second input data point at a second location relative to the image data, the second input data point triggered by actuation of the input device; and display, at the user interface, a graphical object representing the bounding box as an overlay of the image data, the bounding box having corners defined by the first location and the second location, the bounding box having edges connecting the corners, the edges defined by the edge angle.

\* \* \* \* \*